Figure 1:
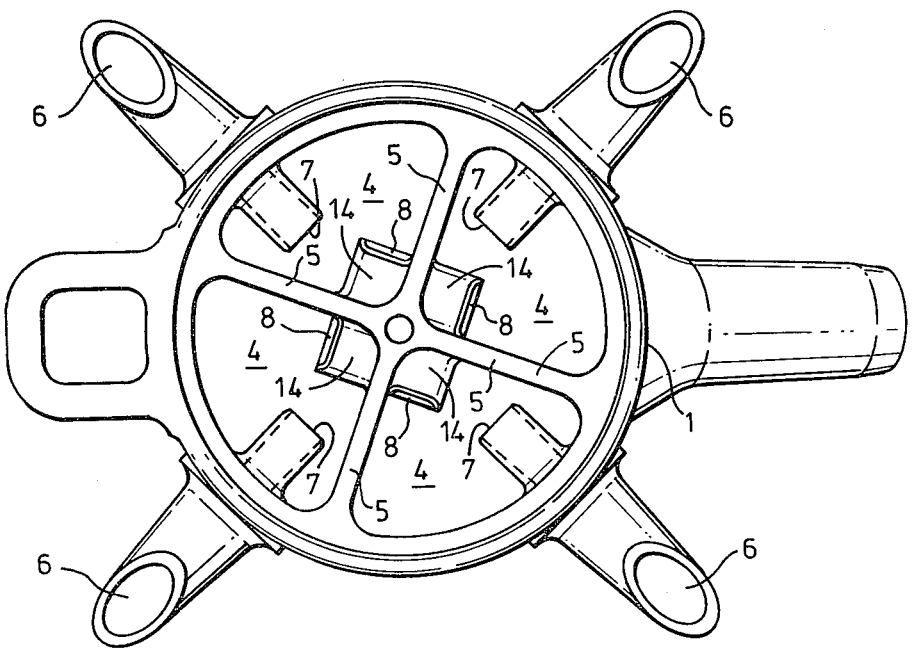

United States Patent [19]

Millar

[11] 4,434,744
[45] Mar. 6, 1984

[54] METHODS OF AND/OR APPARATUS FOR MILKING ANIMALS

[75] Inventor: Thomas D. Millar, Hamilton, New Zealand

[73] Assignee: AHI Operations Limited, Manukau, New Zealand

[21] Appl. No.: 369,570

[22] Filed: Apr. 19, 1982

[51] Int. Cl.³ ................................................ A01J 5/04
[52] U.S. Cl. .............................. 119/14.02; 119/14.36; 119/14.54
[58] Field of Search .............. 119/14.02, 14.08, 14.14, 119/14.36, 14.54, 14.55

[56] References Cited

U.S. PATENT DOCUMENTS 4,253,419  3/1981  Yang ............................ 119/14.54
4,365,589 12/1982  Phillips et al. .................. 119/14.55

*Primary Examiner*—Hugh R. Chamblee
*Attorney, Agent, or Firm*—Holman & Stern

[57] ABSTRACT

A milking claw of the type employed for connecting teat cups to a milk line of a milking machine having a claw body including a common chamber for receiving milk from the teat cups and flow directing means for creating a vortex in the fluid within the common chamber sufficient to counter back pressure on the fluid within the chamber and substantially prevent backflow of milk from the chamber to the teat cups. In a particular embodiment, the claw body includes individual chambers for receiving milk from each of the teat cups and for discharging milk to the common chamber interposed between the teat cups and the common chamber. This embodiment may further include means known to the prior art for creating a vortex in the fluid within each of the individual chambers, in addition to the flow directing means of the present invention.

16 Claims, 3 Drawing Figures

METHODS OF AND/OR APPARATUS FOR MILKING ANIMALS

This invention relates to methods of and/or apparatus for milking animals.

In the milking of lactating animals (cows) it is usual to provide a connecting unit usually and herein referred to as a claw to join each of the four teat cups together, to collect the milk from each teat cup and to provide a central connection point through which vacuum and air pulsation may be applied to the teat cup.

It is well known that under adverse milking conditions, such as when a teat cup slips off a teat or some other event occurs which occasions a large air leak at a teat cup, and even sometimes during normal milking, milk or particles of milk may travel from one teat to another (or the others), or when the claw is handled or suspended between milkings, milk may flow back to the claw from the system piping or from the claw to one or more of the teat cups.

If this milk is contaminated or carries infection from an infected teat or quarter, the infected milk may cause further infections in other quarters of the same cow, or in cows subsequently milked with the same milking cluster.

With a milking claw of current or standard design, there is no provision to prevent back flow of milk and/or air so that when a teat becomes dislodged, air at atmospheric pressure will fill that claw. The claw is then at a higher (or more positive) pressure than the residual vacuum level remaining in the teat cups around the teat ends so milk particles may be forced to travel back towards those teat ends. It has been widely accepted that this is one of the most dangerously effective mechanisms for transmitting or transferring infected or bacteria laden milk from one teat to another or from a previously milked cow to the cow currently being milked.

It is therefore an object of the present invention to provide a method of and/or apparatus for milking animals which will obviate or minimise the disadvantages above outlined or which will at least provide the public with a useful choice.

Accordingly in one aspect the invention consists in a method of milking animals using a milking machine which method includes the steps of directing the fluid emanating from each teat cup of a cluster of teat cups into a common chamber leading to a milk tube leading from the cluster of teat cups to a milk line of the milking machine in a manner such that the interchange of milk between said teat cups is obviated or minimized by creating a swirling or vortex action in said common chamber.

In a further aspect the invention consists in apparatus for use in a milking machine for milking animals, said apparatus comprising a claw body, a milk connection to said claw for each teat cup in a cluster of teat cups associated in use with said claw, each said milk connection leading to a individual chamber which directs the milk to a common outlet which in turn leads to a milk line, said common chamber being shaped and said milk connections being shaped and positioned so that a swirling or vortex action takes place in said common chamber such that a return flow of milk into said individual chambers or the teat cups connected thereto from said common chamber is substantially prevented.

To those skilled in the art to which this invention relates, many changes in construction and widely differing embodiments and applications of the invention will suggest themselves without departing from the scope of the invention as defined in the appended claims. The disclosures and the descriptions herein are purely illustrative and it is not our intention to limit the scope of the invention by those disclosures and descriptions, or otherwise, than by the terms of the appended claims.

Figure 3:
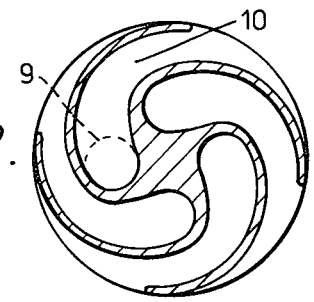
Figure 2:
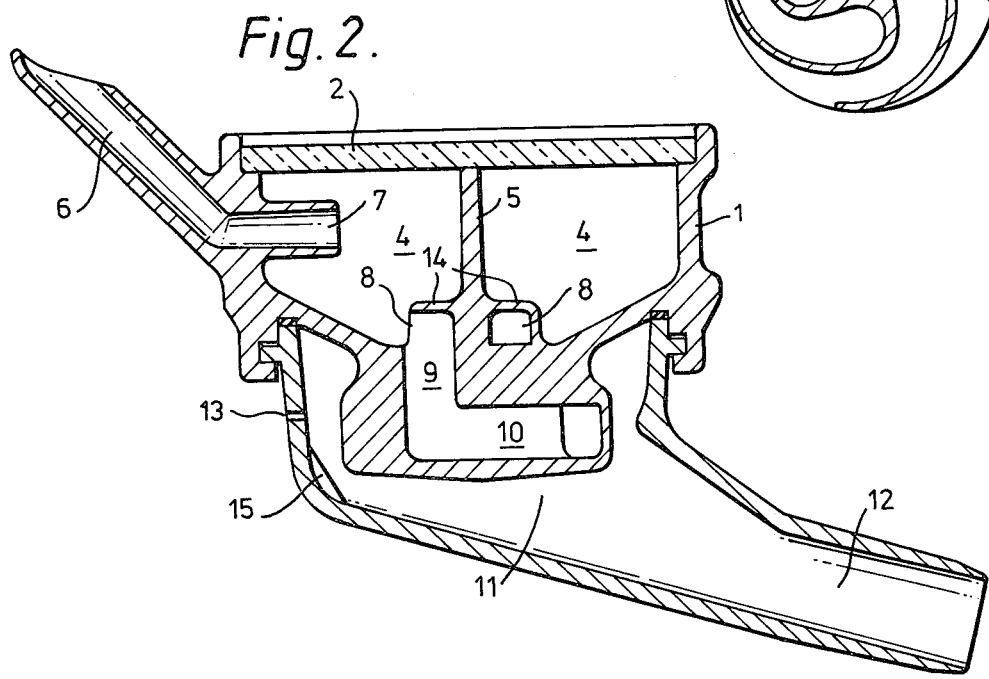

One preferred form of the invention and modifications therefore will now be described with reference to the accompanying drawings in which:

FIG. 1 is a plan view of the body of a milking machine claw incorporating the invention, FIG. 2 is a typical cross section of the construction shown in FIG. 1, and FIG. 3 is a cross section on the line III—III, FIG. 2.

Referring to the drawings a milking claw for the use in a milking machine of known construction comprises a body 1 which is closed off on its upper surfaces by diaphragm (2) or gasket and cover (not shown).

The body 1 is divided into four equal individual chambers 4 by dividing walls 5. Milk inlets 6 are provided through which milk is introduced into the individual chambers from the inner cavities of four teat cups to which they are connected in use. The inlets 6 comprise short tubes 7, parts of each extending into and being positioned in an upper part of each of chambers 4 and directed in such a manner that fluid emerging into a chamber 4 from inlet 6 will tend to swirl around and form a vortex in chamber 4. The greater the inlet velocity of the fluid, the stronger the vortex that will be set up. Ideally each of chambers 4 is circular in cross section when viewed from the top and the inlet conduit 7 is flush with and tangential to the inner surface of chamber 4 to assist the formation of a fluid vortex. However if a body is moulded with four circular chambers 4 it is difficult if not impossible to maintain the uniformity of section or wall thickness necessary for good moulding particularly where one circular chamber is close to another chamber and if voids are moulded between the chambers to assist in regulating the section thickness of the body material those voids could present hygiene problems by forming bacteria traps or increasing cleaning difficulties. In practice it has been found that the quarter circle section shape of each of chamber 4 still permits fluid flow to form a vortex adequate for correct operation of the device as described herein.

Further, conduit 7 protrudes into chamber 4 to prevent or reduce milk backflow from chamber 4 through conduit 7 under static conditions as will be described later.

Milk and/or air passes through chamber 4 to orifice 8, through conduit 9 and spiral passage 10 into collector bowl 11 and out via port 12 which is connected by means of a flexible tube to the milk line which normally operates under a reduced pressure or "vacuum" of about −50 kPa.

Milk flowing from each of the spiral passages 10 will be directed into bowl 11 at an acute angle to the inside surface of bowl 11 so that the milk from each of the four spiral passages 10 combines to flow in a circular manner around bowl 11 until it reaches outlet 12 from which it flows to the "milk line" aided by atmospheric air admitted to bowl 11 via orifice 13.

Under normal milking conditions milk will pass smoothly through the claw as heretofore described without unnecessary or excessive turbulence or agitation and with little if any risk of damage to fat particles in the milk.

If any one (or more) of the teat cups "slips", (admits air) or is dislodged from a teat, air will flow rapidly into that teat cup under atmospheric pressure.

This rapid influx of air will increase the rate of circular flow of the milk/air mixture in the relevant chamber 4 so that the milk remaining in that chamber 4 will move outwards under centrifugal force and be generally held to the outside of the vortex so formed.

Each orifice 8 through which fluid exits from one of the chambers 4 lies normal to the adjacent wall 5 and is an opening in an upstand 14 in a lower part of the partitions between the chambers 4. Each orifice 8 is facing "downstream" to the vortex so tht fluid (air or milk) must change direction of flow to pass through orifice 8. This is relatively easy for air to do as it is of low density while the higher density of milk tends to prevent that milk from changing direction so readily.

Since there is usually only a small quantity of milk in chamber 4 at any time during milking and since the falling off of a teat cup prevents further supply of milk to chamber 4 this small quantity of milk may be retained in chamber 4 while the air influx condition is maintained.

Also under said air influx condition, air flowing through chamber 4 must exit from chamber 4 through orifice 8 conduit 9 and spiral passage 10 to combine with the "circular" milk flow in bowl 11. This air flow accelerates the milk flow in bowl 11 so that the milk will move outwards from the centre of bowl 11 under centrifugal force until it passes out through port 12 to the milk line.

Under these "vortex" conditions it is almost impossible for milk flowing rapidly in a circular path inside bowl 11 to move inwards or to reverse its direction of flow to enter any of the other spiral passages 10 and so flow back towards any of the other chambers 4 and teat cups.

Thus it will be seen that under the worst conditions when air is introduced to any teat cups, the vortex flows, induced by the air, effectively prevents milk or air passing from any one teat cup or chamber 4 to any other.

Even if a condition did arise under which air was caused to flow in a reverse direction into any of spiral passages 10 such air would enter chamber 4 through orifice 8 and passageway 9 leading to orifice 8 which has a position and direction which directs such air flow into chamber 4 in such a direction that it sets up a circular flow condition around chamber 4 so that any milk remaining in chamber 4 would move outwards against the inside surfaces of chamber 4 and the air would have to reverse direction of flow to exit via orifice 7 and flow towards the teat cup and teat connected thereto. Milk being of heavier density than air would not readily change direction and would thus be retained in chamber 4.

It will therefore be seen that under normal milking conditions milk will flow smoothly and without undue agitation or turbulence from the teats through the claw to the milk line but under adverse conditions which may arise when a teat cup in a cluster slips off a teat or when the teat cups are being placed on or removed from a cow an inrush of air under atmospheric pressure will not cause milk or milk droplets to flow back towards other teats on that animal.

Under static or non-milking conditions, during normal handling of a cluster a standard type of claw as is now widely used, milk may flow back from the "long milk tube" (the flexible pipe connecting the cluster to the milk line) into the claw and/or from the claw to the teat cups.

With the construction above described this is much less likely to happen.

If milk from the long milk tube should flow back into outlet 12, it must fill up bowl 11 until it reaches the invert level of spiral passage 10. This retains much of the possible quantity which may be stored in the long milk tube. If additional milk flows back into bowl 11 it will flow through each or any of passages 10 into chambers 4 wherein it must fill to the level of the lowest part of any tube 7 before it may flow towards a teat cup.

The claw is so proportioned that it has adequate capacity to contain the likely quantity of milk which may be in the order of 90 ml. and to contain a satisfactory quantity even when the claw is tilted during manual manipulation.

The design of a claw so described has been shown to present few washing or cleaning problems with both "normal" or "reverse flow" washing systems. Cleaning of the bowl 11 is facilitated by providing one or more turbulence causing vanes 15 in the bowl 11.

What is claimed is:

1. In a milking machine claw of the type used in association with a cluster of teat cups in a milking machine for milking animals, and having a claw body included in a common chamber for receiving milk from each of the teat cups, the improvement comprising a plurality of milk-receiving chambers interposed between said teat cups and said common chamber for receiving milk from said teat cups and for distributing received milk to said common chamber;

communication means for communicating each of said teat cups with a milk-receiving chamber and for communicating each of said milk-receiving chambers with said common chamber; and flow direction means for creating a vortex in the fluid within said common chamber to substantially prevent backflow of milk into said teat cups during milking.

2. The milking claw of claim 1, wherein said flow-directing means comprises means for establishing a spiral flowstream of fluid from each of the milk-receiving chambers into the common chamber.

3. The milking claw of claim 1, further including means for creating a vortex in the fluid within each of the milk-receiving chambers.

4. The milking claw of claim 1, wherein the flow-directing means comprises means for directing the fluid entering the commom chamber from each of the milk-receiving chambers to enter at similar acute angles to the inner surface of the common chamber and combine in a circular flow to form a vortex within the common chamber.

5. The milking claw of claim 1, wherein said flow-directing means comprises an outwardly-directed spiral passageway from each milk-receiving chamber into said common chamber.

6. The milking claw of claim 5, wherein the outlet of each passageway is oriented downstream of the vortex so that fluid within said common chamber must change direction of flow to enter said passageway from said common chamber.

7. The milking claw of claim 5, wherein the outlet of each passageway is disposed to counteract backflow of milk from the common chamber to the teat cups under the force of gravity.

8. The milking claw of claim 1, wherein said flow-directing means includes a radially-increasing, circumferentially-directed passageway from each milk-receiving chamber into said common chamber.

9. The milking claw of claim 8, wherein each of the circumferentially-directed passageways forms an involute or spiral curve.

10. The milking claw of claim 1, wherein said flow directing means includes shaping the common chamber to accentuate the vortex when the flow of fluid is augmented by a rapid inrush of air into the common chamber.

11. The milking claw of claim 10, wherein the common chamber is bowl-shaped.

12. The milking claw of claim 1, further including interrupting means for causing turbulence in fluid flow within the common chamber to promote washing action of the fluid.

13. The milking claw of claim 12, wherein said interrupting means comprise at least one vane disposed within said common chamber.

14. The milking claw of claim 12, wherein said vane is disposed on the inner surface of said common chamber.

15. A method for minimizing backflow of fluid in a milking claw having a claw body including a common chamber for receiving milk from a cluster of teat cups and a plurality of milk-receiving chambers interposed between said teat cups and said common chamber for receiving milk from said teat cups and distributing received milk to said common chamber, said method comprising creating a vortex in the fluid within said common chamber sufficient to counteract back pressure on the fluid within the common chamber exerted by the presence of a pressure differential between the claw body and at least one of the teat cups.

16. The method of claim 15, wherein the pressure differential between the claw body and the teat cups is caused by a rapid rush of air under atmospheric pressure into the claw body, and said method further includes directing said rapid inrush of air into the vortex to increase the vortical movement thereof.

* * * * *